INVENTOR.
WAYNE H. McVAUGH
BY
OSTROLENK, FABER, GERB & SOFFEN
ATTORNEYS

United States Patent Office 3,515,396
Patented June 2, 1970

3,515,396
GASKET FOR INTERFITTING CONDUIT SECTIONS OF AN ISOLATED PHASE BUS SYSTEM
Wayne H. MacVaugh, Haddonfield, N.J., assignor, by mesne assignments, to I-T-E Imperial Corporation, Philadelphia, Pa., a corporation of Delaware
Filed Aug. 17, 1967, Ser. No. 661,320
Int. Cl. F16j *15/02*
U.S. Cl. 277—177                    4 Claims

ABSTRACT OF THE DISCLOSURE

A gasket for sealing the annular space defined between interfitting conduit sections of an isolated phase busbar system, which gasket includes a pair of oppositely directed shoulder portions each in blocking relationship with respect to one end of each of the interfitting conduit sections such that the gasket is prevented from becoming unseated.

---

This invention relates to isolated phase busbar systems and more particularly relates to a novel sealing gasket utilized in the annular space defined between interfitting conduit sections of the system.

A common type of power distribution system, known as an isolated phase busbar system, includes one or more busbars about each of which is centered a cylindrical housing or enclosure. Since such busbar systems are constantly subjected to extremes in temperature, such as the heat generated from the current-carrying busbars therein and the cold of the external atmosphere in winter, it is common to construct the cylindrical enclosures for the busbars in segmented lengths with means being provided at the juncture of the various sections to allow for expansion and contraction.

One common means of providing for expansion and contraction is to partially insert one end of what may be designated a stationary conduit section of predetermined diameter into the open end of a larger adjacent conduit section which is commonly designated the movable section. It will be appreciated therefore that the larger movable sections will thereby be free to ride along the exterior surface of the smaller stationary conduit section in response to changes in temperature.

The above described arrangement allows for expansion and contraction of the busbar enclosure, but due to the rather coarse tolerances involved, results in the formation of a small annular space between the exterior surface of the stationary conduit section and the interior surface of the larger movable conduit section. Accordingly, it is common in the industry to locate a sealing gasket in this annular space in order to prevent the entry of rain or other extraneous substances into the interior of the busbar enclosure.

A common type of sealing gasket prevalent in the industry has been a generally elongated ring-like rubber gasket which is cemented on the exterior surface of the smaller stationary conduit section such that the larger diametered movable section is still free to ride along the exterior surface of the rubber gasket in response to changing temperatures. However, the above described ring-like gaskets of the prior art have given rise to serious problems which the instant invention effectively overcomes.

Specifically, on various occasions, it has been discovered that continuous exposure to environmental conditions, along with the constant relative sliding movement of the cooperating conduit sections, has caused the rubber gaskets to be pried loose from their cemented relationship with respect to the exterior surface of the stationary conduit section. Once the cement gives way, the ring-like gasket is free to travel along the exterior surface of the stationary conduit section with the movement of the larger movable section. Accordingly in many instances it has been discovered that the gasket has dislodged itself from its proper seating between the overlapped conduit sections and in some instances finally fell within the busbar encolsure, while in other instances, the gasket has been pushed out of its proper sealing position. When either of these two conditions occur, the annular space between the overlapped conduit sections is open to the atmosphere and on various occasions rain has entered the busbar enclosure and caused a failure of the system.

In contradistinction to the prior art gaskets described above, the instant invention comprises a sealing gasket which, like the prior art, has a generally ring-like cylindrical central portion which is seated within the overlap portion of adjoining conduit sections, but unlike the prior art gaskets, includes a pair of integral shoulder portions which extend in opposite directions from the central portion of the gasket. One such shoulder portion extends inwardly toward the center of the busbar enclosures so as to be in blocking relationship with the inserted end of the stationary conduit section while the other such shoulder portion extends outwardly from the center of the busbar enclosure as to be in blocking relationship with the overlapped end of the larger movable conduit section. In this manner, even in the situation where the gasket has been dislodged from its cemented seating, and the gasket has begun to creep in response to continual relative movement between the adjoining sections; the oppositely directed shoulder portions will prevent the gasket from either falling into the enclosure or being dislodged out of its proper seating relationship. In other words, and as will be further explained in greater detail, the oppositely directed shoulder portions of the gasket effectively trap the gasket in its proper seating relationship between the exterior surface of the stationary conduit section and the interior surface of the movable conduit section.

Accordingly, it is an object of the instant invention to provide a sealing gasket for interfitting conduit sections of an isolated phase busbar system which is so designed as to prevent such gasket from being dislodged from its proper sealing relationship.

Another object of the instant invention is to provide such a sealing gasket which includes a generally elongated ring-like central portion having a pair of oppositely directed shoulder portions extending from opposite ends thereof.

Yet another object of the instant invention is to provide such a sealing gasket which is of integral construction and thereby simple and inexpensive to manufacture.

Other objects of the instant invention may be had by referring to the following description and drawings, in which.

Figure 1:
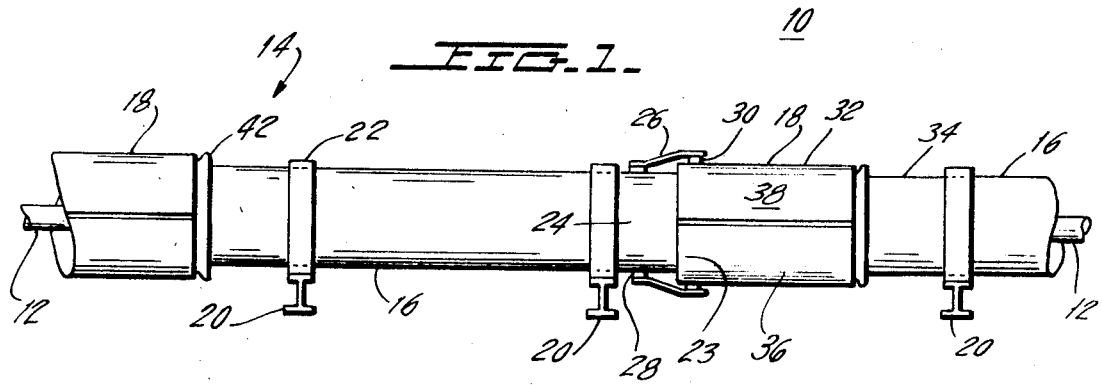
FIG. 1 illustrates one phase of an isolated phase busbar system which utilizes the sealing gasket of the instant invention.

Turning to FIG. 1, there is shown one phase of a busbar system 10 which includes an elongated busbar 12, appropriately supported within a cylindrical enclosure, generally designated 14.

Figure 2:
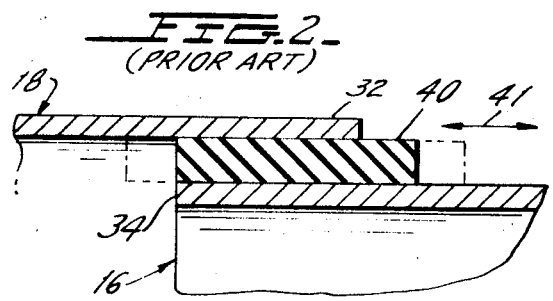
FIG. 2 is an illustration showing a prior art sealing gasket.
Figure 3:
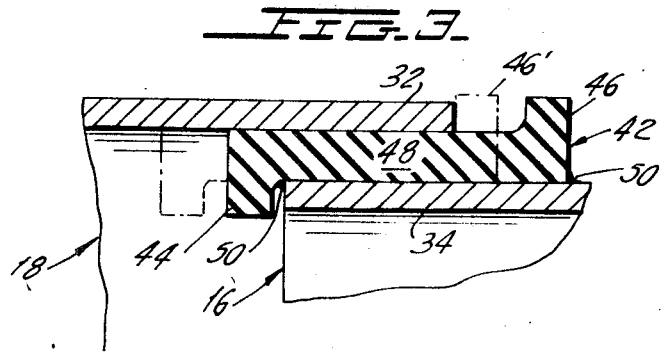
FIG. 3 is a cross-sectional view of the sealing gasket of the instant invention located between overlapped conduit sections of the busbar system shown in FIG. 1.

The enclosure 14 includes alternately spaced stationary conduit sections 16 and generally movable sections 18, with the stationary sections 16 being supported on generally I-shaped beams 20 by means of the encircling channel rings 22. As can be seen in FIG. 1, the movable sections 18 are of larger diameter than the stationary sections 16 such that, as best illustrated in FIGS. 2 and 3, the movable sections 18 may partially overlap the ends of the stationary sections 16. In practice, the movable sections 18 are fixed with respect to one of their adjoining sections 16 since, as illustrated in FIG. 1, one end such as 23 of the movable sections 18 is virtually secured to the cooperating end 24 of stationary sections 16 by means of the grounding straps 26 which join appropriately secured metallic blocks 28 and 30, respectively. Thus in the illustration of FIG. 1, it is the end 32 of the movable sections 18 which will slide along the exterior surface 34 of the stationary sections 16 in response to changing environmental temperature conditions.

Before turning to the specific construction of the gaskets illustrated in FIGS. 2 and 3, it may be pointed out that the movable sections 18 are preferably of two-piece construction including a semi-cylindrical base portion 36 to which is removably secured a cover portion 38.

Turning to FIG. 2, there is shown an enlargement of a typical prior art arrangement for providing a seal between the overlap between the right end 32 of the movable conduit section 18 and the left end 34 of the stationary conduit section 16 of FIG. 1. It may be seen that a generally ring-like elongated gasket 40 is seated intermediate the exterior and interior surfaces of the ends 34 and 32, respectively, to prevent the entrance of moisture and other extraneous substances into the interior of the enclosure. As noted previously, it is customary to cement the gasket 40 to the exterior surface 34 of the stationary conduit sections 16 such that the movable section 18 is free to slide back and forth (indicated by the two-headed arrow 41) along the exterior surface of the gasket 40 in response to elongation and contraction due to temperature changes.

It may be appreciated, however, that in the event the gasket 40 becomes free of its cement, then upon continual movement of the gasket 40 under the influence of the movable section 18, it is possible for the gasket 40 to either slide to the left in FIG. 2, in which case it may eventually fall within the enclosure or, in the alternative, it may continue to slide to the right in FIG. 2 in which case it may no longer be seated within the overlapped portions of the conduit sections.

Turning to FIG. 3, there is illustrated a gasket 42 of the instant invention which includes a pair of oppositely directed shoulder portions 44 and 46, respectively, extending from opposite sides of a generally elongated central portion 48. Thus with the instant invention it may be appreciated that even in the situation where the gasket 42 has broken free of its cemented relationship with respect to the stationary conduit sections 16, as indicated at 50, it will be impossible for the gasket 42 to either fall into the interior of the enclosure, e.g., by moving to the left, or in the alternative it will be impossible for the gasket to slide to the right in FIG. 3 to such position that it will no longer seal the annular space between the surfaces 32 and 34. Thus should the gasket 42 steadily creep toward the left in FIG. 3, eventually the shoulder 46 will abut the right end 32 of the movable conduit section 18 as indicated in phantom at 46'. Likewise, should the gasket be somehow dislodged toward the right in FIG. 3, it will be appreciated that the shoulder 44 will abut the left end 34 of the stationary conduit section 16. Thus the instant invention effectively traps the gasket 42 in its proper sealing relationship between the stationary and movable sections of the enclosure.

It may be pointed out that the gasket is constructed of a rubber-like material such as neoprene and is preferably secured as by the cement dabs 50 to the exterior surface of the stationary conduit section 16. Although the cement 50 is not strictly necessary to retain the gasket 42 in position once the movable conduit section 18 is in place, it may be appreciated that such cement is useful to retain the gasket 42 in its seated position until the removable cover portion 38, shown in FIG. 1, is actually attached to the semi-cylindrical base portion 36.

Thus there has been described a novel gasket for sealing the annular space defined between the overlapping sections of an elongated busbar enclosure. However, it is to be appreciated that the instant invention is not limited to application in busbar systems since it would be equally applicable in any situation where it is desirable to sealingly join a pair of telescoped conduit sections.

Although there has been described a preferred embodiment of this novel invention, many variations and modifications will now be apparent to those skilled in the art.

The embodiments of the invention in which an exclusive privilege or property is claimed are defined as follows:

1. In a conduit system, including at least two conduits, one of which is stationary with respect to and is partially located within and extends out of the other, wherein an annular space is defined between the exterior surface of said one conduit and the interior surface of said other conduit;
   a gasket positioned in said annular space for sealing said space;
   the improvements comprising,
   said one conduit being of cylindrical form out of its free end;
   said other conduit having a generally semi-cylindrical base and a complementary member with substantially constant diameter out to its free end;
   said gasket being affixed to the exterior surface of said one conduit near its said free end;
   said gasket comprising, a generally elongated, cylindrical, ring-like central portion having a first shoulder at one end thereof, which shoulder extends inwardly toward the center of said conduits and a second shoulder at the opposite end of said gasket extending outwardly away from the center of said conduits;
   said first shoulder being in blocking relationship with respect to said free end and extending over said free end of said one conduit;
   said second shoulder being in blocking relationship with respect to said free end and extending over said free end of said other conduit;
   whereby said first and second shoulders maintain the sealing of said annular space in the even of said gasket becoming loosened from its affixed position and free to move within said space.

2. In the conduit system of claim 1, wherein said central portion and said shoulder are of integral construction.

3. In the conduit system of claim 1, wherein said gasket is constructed of compressible material.

4. A conduit system including at least two conduit sections, one of which is partially located within the other, and wherein an annular space is thereby defined between the exterior surface of said one and the interior surface of said other, a gasket positioned in said annular space for forming a seal of said annular space;
   the improvements comprising:
   said other of said conduit sections consisting of a generally semi-cylindrical base and having a generally semi-cylindrical removable cover secured thereto;
   said gasket including a generally elongated central portion having first and second shoulder portions extending therefrom in opposite directions; and being affixed to the exterior surface of said one conduit section;
   whereby said gasket will remain in place on said exterior surface of said one of said conduit sections whenever said cover of said other of said conduit sections is removed;

one of said first and second shoulder portions being in blocking relationship with respect to one end of said one of said conduit sections such that said gasket can move only a restricted distance toward the other end of said one of said conduit sections;

the other of said first and second shoulder portions being in blocking relationship with respect to one end of the other of said conduit sections such that said gasket can move only a restricted distance toward the other end of said conduit sections;

whereby said first and second shoulder portions serve to maintain the sealing of said annular space upon said gasket's becoming loosened from its initially affixed position and otherwise free to move within said space.

References Cited

UNITED STATES PATENTS

| 1,662,603 | 3/1928 | Ferguson. | |
| 3,066,961 | 12/1962 | Gerin. | |
| 3,229,998 | 1/1966 | Pennington | 285—419 |
| 2,982,569 | 5/1961 | Miller et al. | 277—207 |

FOREIGN PATENTS

| 1,269,188 | 7/1961 | France. |

OTHER REFERENCES

Semmler, German application 1,153,952, printed Sept. 5, 1963.

DORSEY NEWTON, Primary Examiner

U.S. Cl. X.R.

285—231